United States Patent
Bohe et al.

(10) Patent No.: US 9,536,002 B2
(45) Date of Patent: Jan. 3, 2017

(54) DIGITAL CONSUMER DATA MODEL AND CUSTOMER ANALYTIC RECORD

(71) Applicant: Accenture Global Services Limited, Dublin (IE)

(72) Inventors: Astrid Bohe, Frankfurt (DE); Gianluca Cervini, Gallarate (IT); Gianluca Zobi, Rome (IT)

(73) Assignee: Accenture Global Services Limited, Dublin (IE)

( * ) Notice: Subject to any disclaimer, the term of this patent is extended or adjusted under 35 U.S.C. 154(b) by 643 days.

(21) Appl. No.: 13/779,115

(22) Filed: Feb. 27, 2013

(65) Prior Publication Data

US 2013/0226657 A1 Aug. 29, 2013

(30) Foreign Application Priority Data

Feb. 27, 2012 (EP) ..................................... 12425042

(51) Int. Cl.
*G06F 17/30* (2006.01)
*H04W 4/02* (2009.01)
(Continued)

(52) U.S. Cl.
CPC ..... *G06F 17/30867* (2013.01); *G06F 17/3056* (2013.01); *G06F 17/30902* (2013.01);
(Continued)

(58) Field of Classification Search
None
See application file for complete search history.

(56) References Cited

U.S. PATENT DOCUMENTS

| 8,849,862 B2 * | 9/2014 | Visscher | G06Q 10/06 |
| | | | 705/7.12 |
| 2003/0063072 A1 * | 4/2003 | Brandenberg | G01S 5/02 |
| | | | 345/173 |

(Continued)

FOREIGN PATENT DOCUMENTS

| CN | 101094481 | 12/2007 |
| CN | 101404671 | 4/2009 |

(Continued)

OTHER PUBLICATIONS

Little, Thomas DC, et al. "A digital on-demand video service supporting content-based queries." Proceedings of the first ACM international conference on Multimedia. ACM, 1993.*

(Continued)

*Primary Examiner* — Gurkanwaljit Singh
(74) *Attorney, Agent, or Firm* — Fish & Richardson P.C.

(57) ABSTRACT

As a company expands its businesses to include digital products and services in addition to more traditional telecommunications and media offerings, digital consumption data may be used along with telecommunications consumption data and other customer-centric information in order to create a more comprehensive data model and make better predictions. A customer-centric data model identifies entities with data from diverse locations and product sectors associated with a single customer. Customer analytic records aggregate existing data into base variables and store it for each customer along with additional variables generated by performing calculations on exiting data. Both the data model and the customer analytic records can be used by the company to make more accurate business and marketing decisions.

12 Claims, 5 Drawing Sheets

(51) Int. Cl.
*H04W 28/06* (2009.01)
*G06Q 30/02* (2012.01)
*G05B 15/02* (2006.01)
*G06Q 10/06* (2012.01)
*H04N 21/238* (2011.01)
*H04L 29/06* (2006.01)

(52) U.S. Cl.
CPC .......... *G06Q 30/0201* (2013.01); *H04W 4/02* (2013.01); *H04W 28/06* (2013.01); *G05B 15/02* (2013.01); *G06Q 10/06* (2013.01); *H04L 29/06* (2013.01); *H04N 21/238* (2013.01)

(56) References Cited

U.S. PATENT DOCUMENTS

| | | | |
|---|---|---|---|
| 2004/0032393 A1* | 2/2004 | Brandenberg | G06F 17/3087 345/156 |
| 2007/0040934 A1* | 2/2007 | Ramaswamy | H04N 21/235 348/385.1 |
| 2007/0185867 A1 | 8/2007 | Maga et al. | |
| 2009/0006467 A1* | 1/2009 | Visscher | G06Q 10/06 |
| 2009/0326947 A1* | 12/2009 | Arnold | G10L 15/26 704/257 |
| 2010/0119053 A1 | 5/2010 | Goeldi | |
| 2010/0332373 A1* | 12/2010 | Crabtree | G06Q 50/06 705/37 |
| 2013/0166580 A1* | 6/2013 | Maharajh | H04L 65/605 707/758 |
| 2013/0204664 A1* | 8/2013 | Romagnolo | G06Q 30/0203 705/7.32 |

FOREIGN PATENT DOCUMENTS

| | | |
|---|---|---|
| CN | 101981587 | 2/2011 |
| EP | 2110780 | 10/2009 |
| WO | WO 2004/053751 | 12/2007 |

OTHER PUBLICATIONS

Yoneki, Eiko, and Jean Bacon. "An Adaptive Approach to Content-Based Subscription in Mobile Ad Hoc Networks." Percom Workshops. 2004.*
Saroiu, Stefan, et al. "An analysis of internet content delivery systems."ACM SIGOPS Operating Systems Review 36.SI (2002): 315-327.*
Eager, Derek L., Michael C. Ferris, and Mary K. Vernon. "Optimized regional caching for on-demand data delivery." Electronic Imaging'99. International Society for Optics and Photonics, 1998.*
Canadian Office Action issued in Application No. 2808096, dated Feb. 12, 2015, 2 pages.
European Search Report issued in Application No. 12425042.4, dated Jul. 12, 2012, 6 pages.
"Statement in Accordance with the Notice from the European Patent Office Dated Oct. 1, 2007 Concerning Business Methods," dated Nov. 1, 2007, 1 page.
Canadian Office Action issued in Application No. 2,808,096, dated Mar. 31, 2016, 6 pages.

* cited by examiner

DIGITAL CONSUMER DATA MODEL AND CUSTOMER ANALYTIC RECORD

CROSS-REFERENCE TO RELATED APPLICATION

Under 35 U.S.C. §119, this application claims the benefit of a foreign priority application filed in the European Patent Office as EP Serial No. 12425042.4 on Feb. 27, 2012, the entire contents of which is hereby incorporated by reference.

BACKGROUND

Telecommunications companies now offer a wide variety of services to their customers, including providing digital content. Digital content includes applications, downloading and streaming media, and online purchases. At the same time that telecommunication companies are expanding to cover digital content, media companies offering digital content are now expanding to include telecommunications services. These companies, which have traditionally offered one of these products but now have expanded to include both, can be thought of as convergent companies.

Because digital content sales and services have often been managed separately from telecommunications sales and services, the data has also been managed separately. Although a single customer may have activity on both the telecommunications and digital content products lines in addition to other lines of the company's business like IPTV, the customer's activities and strategies for dealing with that customer would typically be handled in a segregated fashion. The different product lines of these convergent companies operate, in effect, as multiple distinct business entities rather than as a unified business.

SUMMARY

The solutions described herein include a data model and a customer analytic record (CAR), along with a procedure to generate the CAR.

A data model includes information of different business lines at convergent customer level, including digital customer, e.g., a digital consumer, entities, metrics, and dimensions. The data model is a set of entities related to each other through an entity-relationship (E-R) diagram. The entities can be related to, for example: customer socio-demographics, external market researches, interactions between customer and company, traffic and network events, perception, e.g., (sentiment), about company services/products/brand, customer portal navigation paths, revenues, profit, products and services subscriptions, digital products purchases and consuming, and tariff plans at the customer level.

The data model is the base for the analytic data mart and analytic dashboards to be presented to and used by the company in a number of ways including alerts, structure queries, feeds for ad hoc reporting, dashboards for static reporting, and insight case management. Any of these can be formatted and digested to be presented to marketing and business managers within the company in any appropriate format.

Another solution involves the use of a customer analytic record (CAR) along with predefined rules to aggregate source data and generate the CAR. The CAR is list of records where each record refers to a unique customer and each field is a variable related to the Customer. The CAR includes variables related to the Digital products consumption The data associated with a given customer comes from multiple separate data storage locations in order to collect customer activity data associated with different product lines, including consumption of digital content. The extracted data is processed and combined into a data structure to form a customer analytic record (CAR) that more completely and accurately describes the full range of the customer's behavior with respect to all offerings of the business. In addition to consumer behavioral profiles and usage patterns for multiple different product lines including digital consumption, the data model includes customer demographic information, and even known customer attitudes expressed through surveys and online. Once generated, the CAR can support a variety of analytical processes. Multiple dimensions of the customer profile, including patterns of digital consumption, can be used to identify groups of customers with similar traits. Predictions can be made about each consumer segment regarding customers' profitability, the likelihood of churn, and what upsell and retention efforts are most likely to receive a positive response. This allows product offerings, incentive programs, and sales events to be targeted to those segments of the customer base where they can be most profitable, which can potentially decrease marketing costs while increasing results relative to traditional, broad-based promotions. Upsell efforts based on identifying commonalties in digital consumption behaviors can also lead to additional revenue based particularly on the customer's digital content activities relative to other similar customers. The outputs of this modeling can then enrich the data model.

In one aspect, a method for generating and implementing a data model includes the actions of identifying a plurality of entities, each entity having one or more metrics defining data related to a customer. The plurality of entities includes at least a customer entity and a digital consumption entity. The actions further include defining relationships between entities among the plurality of entities, for each entity, selecting an electronic data source storing data compatible with the one or more metrics of that entity, and implementing data flow and control processes on the selected electronic data sources consistent with the relationships identified between the entities. Additional actions include extracting data from each of the selected electronic data sources in accordance with the implemented data flow and control processes, aggregating the extracted data into a customer-centric data structure, and storing the customer-centric data structure in the electronic data source selected for the customer entity.

Implementations may include one or more of the following features. The plurality of entities further include a telecommunications consumption entity. Defining relationships between entities includes defining a relationship between the customer entity and the digital consumption entity, where implementing data flow and control processes includes transferring data including the digital consumption behavior of a customer to an electronic data source that stores data about the customer aggregated from a plurality of electronic data sources. The electronic data source to which the digital consumption behavior of the customer is transferred, is selected for the customer entity.

In another aspect, a non-transitory computer-readable medium storing software includes instructions executable by one or more computers which, upon such execution, cause the one or more computers to perform operations. The operations include aggregating customer data related to a particular customer from multiple data stores, the customer data including data related to the customer's digital consumption and the customer's consumption of at least one other type of product or service. The operations further include generating a customer analytic record for the particular customer, the customer analytic record including base variables representing at least a portion of the aggregated customer data, and calculated variables derived from pre-determined operations performed on one or more of the base variables. The operations also include accessing the customer analytic record in order to generate an insight regarding the customer using at least one of the calculated variables.

Implementations may include one or more of the following features. The customer data includes data related to the customer's consumption of telecommunications services. The customer data related to the customer's digital consumption includes records of the customer's behavior in at least one of digital applications, downloading and streaming digital content, and online purchases.

In a further aspect, a system for generating and implementing a data model includes an aggregation engine, the aggregation engine configured to aggregate customer data related to a particular customer from multiple data stores, the customer data including data related to the customer's digital consumption and the customer's consumption of at least one other type of product or service. The system further includes a customer analytic record generation engine, the customer analytic record generation engine configured to generate a customer analytic record for the particular customer. The customer analytic record includes base variables representing at least a portion of the aggregated customer data, and calculated variables derived from predetermined operations performed on one or more of the base variables. The system additionally includes an insight generation engine, the insight generation engine configured to access the customer analytic record in order to generate an insight regarding the customer using at least one of the calculated variables.

Implementations may include one or more of the following features. The customer data includes data related to the customer's consumption of telecommunications services. The customer data related to the customer's digital consumption includes records of the customer's behavior in at least one of digital applications, downloading and streaming digital content, and online purchases. The customer data includes sentiment metrics at customer level. The customer data includes metrics calculated upon network level events not related only to rated traffic events.

The details of one or more implementations are set forth in the accompanying drawings and the description, below. Other features of the disclosure will be apparent from the description and drawings, and from the claims.

DETAILED DESCRIPTION

Data Model

The data model is a set of structured data. Much of the information is at the customer level. In particular, the data model is a set of entities related to each other through an entity-relationship (E-R) diagram.

Figure 1:
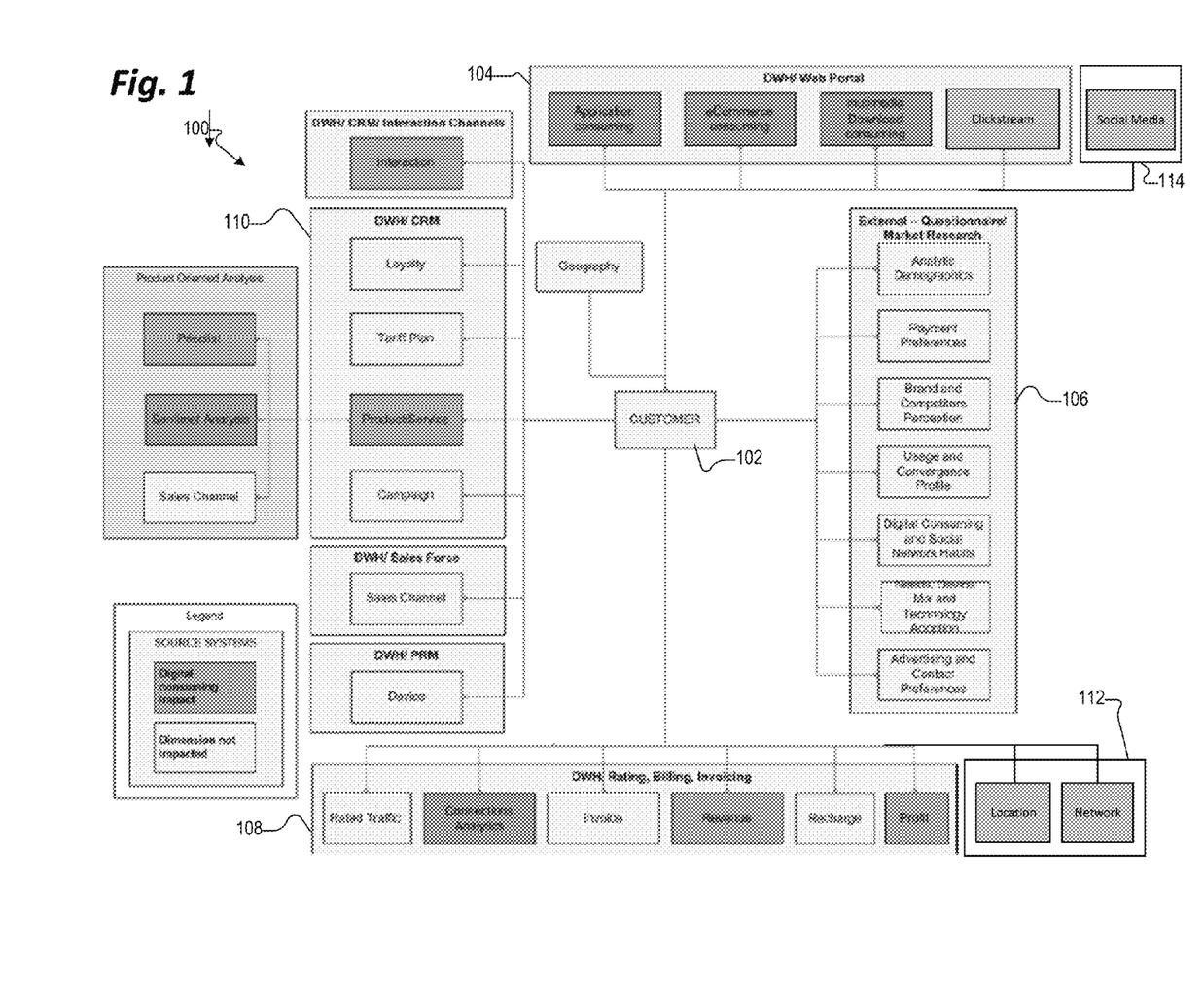
FIG. 1 shows an entity-relationship diagram representing an exemplary data model.

An exemplary E-R diagram 100, representing one data model that may be appropriate for a convergent company including digital customer data, is represented in FIG. 1. In the E-R diagram 100 represents a consumer-centric data model, in which the consumer, represented in the center of the diagram 100 as entity 102, forms relationships with entities associated with a variety of different businesses and systems as shown. Entity data may come from a web portal 104, from external research channels 106, from a rating, billing, and invoicing system 108, from customer relationship management and campaign management systems 110, from the network 112, from mediation systems, from internet and social networks 114, from data warehouses and other systems. Each of the entities and its relationship to the customer 102 may be represented by a variety of different metrics and dimensions.

The entities can be related to virtually any kind of data that relates back to the customer. Some examples of entity data may include:

Socio-demographics.

External market research, such as payment preferences, services usage profile, digital consumption and social network habits, device mix and technology adoption, and advertising and contact preferences.

Interactions, representing the volume and types of interactions between the customer and the company through different channels.

Rated traffic from telecommunications services.

Revenues and profit from different lines of business and products.

Invoices, billing, and payment records.

Devices used to consume the provided services and products.

Tariff plans, including bundles and other multi-service options.

Loyalty and other customer history metrics.

Sales channel.

Networking metrics calculated upon data from incoming/outgoing traffic and on-line interaction, which may be aggregated over a specific period of time.

Metrics calculated upon network level events not related only to rated traffic events The location of the SIM card while connected to the cells of the wireless network, e.g., information regarding what cell phones a customer switches a SIM card between.

Relevance of a customer within communities of telecommunications services users.

Paths of navigation of customer portal done by the customers once authenticated, e.g., information regarding how authenticated customers navigate through various products offered by the company on the customer portal.

Subscriptions to products and services.

Digital product purchases and consumption. This may include data on the consumption in each of the applications, download and streaming, and e-commerce categories.

Metrics and dimensions are defined individually for each entity. For example, an interactions entity may include the number of interactions (metric) and reason of interaction (dimension). As another example, a digital consumption entity may include quantity and volume (metrics) along with content rating, age rating, distributing platform, connection speed class, payment method, price class, timeband, time, category, subcategory (dimensions). As the contrast in these two examples illustrates, which data is collected for each entity may differ widely, and may depend on what data is available as well as on the specifics of the data model.

Digital consumption data may include data generated from a variety of activities characteristic of a digital customer. For example, the customer may choose to download applications representing a variety of categories. Digital consumption data may identify information on the time of purchase, the cost of the application, and the category the application falls into along with any appropriate subcategory. Each application may be classified into one or more categories and subcategories, which may depend not only on the nature of the application but also elements important to the company's continuing relationship with the customer. Ideally, the categories within which a customer has purchased applications will allow a company to target the customer for further application purchases as well as other available services.

Application categories may include, for example: tools and utilities, business, shopping, travel, sports, social, news, and games. Tool and utility applications assist the user with desktop management, messing/chat, playing and editing multimedia, word processing, spreadsheets, and drivers. Subcategories of tools applications may include translator, calculator, and education applications. Business applications provide functionality for business interoperability with mail and calendar, administrative control data, synchronization, message security, and resource planning. Business application subcategories may include finance and management. Shopping applications allow customers to purchase products with mobile devices, perform price comparison and research, and locate shops selling specific products. Shopping application subcategories may include entertainment, electronics, and food. Travel applications include Cartography and GPS, as well as the reservation and purchase of cruises, last-minutes, playground, flights, car rental, travel agencies, hotels, and tours. Travel subcategories may include last-minutes, hotels, rental cars, and GPS. Sports applications may focus on specific sports, diet, monitoring performance, training, food, and sporting events. Sports subcategories may include real-time news, match forecast, and match streaming. Social applications allow the customer to connect and manage social networks, share and compare affinity tests, make friends, attend social events, or even find a mate. Subcategories for social applications may include chat and sharing. News applications include weather, newspaper, TV news, and radio, each of which may have its own subcategory. Game applications may include all sorts of games available for play on the mobile device. Game application subcategories may exist for each genre of game, such as sports, virtual life, and strategy.

Digital consumption data may further include e-commerce, defined as shopping for conventional retail products over the internet rather than at a retail store. Information about what areas of retail shopping a given customer is willing to do online can be very valuable for understanding the customer's amenability to certain online offers. E-commerce categories include books (books, magazines, newspapers, e-books, audiobooks), apparel (clothing, shoes, handbags, accessories, luggage, watches, jewelry), computers and office (laptops, netbooks, tablets, printers and ink, devices and accessories, servers and desktops, software, gaming consoles, media players, internet TV), electronics (TV & video, Hi-fi & home theatre, Cameras, cell phones & accessories, video games & mp3 players, Car & GPS, home appliances, musical instruments, general accessories), health and beauty (natural and bio food, health products, personal care and beauty), entertainment (DVD and Blu-Ray, video games, music CDs), home and garden (Kitchen & Dining, Bedding & Bath, Furniture & Décor, Outdoor living, Lawn & Garden, Sewing, craft & hobbies, Cleaning, Pet Supplies), Sports & Outdoors (Exercise & Fitness, Athletic, Sports wear, Team Sports, Bikes, trekking & outdoor recreation, Golf, Boating & Water sports, Fan shop, Other sports), and kids products (Toys, Books, Electronic games, Clothing, Furnishing, Health and bath, Accessories).

Digital consumption data may further include streaming and downloading of digital content. Again, the various categories and subcategories may provide valuable consumer information. Categories of digital content streaming and downloading may include music (further categorized by musical genre, such as classical, dance, rock, pop, romantic, electronic, country, R&B), images (further categorized by image quality, as well as by subcategories such as Animals and Nature, Cartoons/Comics, Celebrities, Food and Beverages, Holidays and Events, Sport and Outdoors, Office, Kids, Landscapes). online games (further categorized by genre such as Educational, Action, Family, Music, Role playing, Sport, Strategy), and movies (further categorized by picture quality, as well as genre such as Cartoons, Comedy, Crime/Mystery, Drama, Family/children, Historical, Horror/Sci-Fi, Musicals, Romance).

Digital consuming metrics may be aggregated by time and dimension values. Data dimensions may include content rating, age rating, distributing platform, connection speed class, payment method, device used for consuming, price class, and timeband. The digital consumption data may be aggregated for a specific period of time and may be returned in a number of ways according to the needs of any specific analysis tool.

The data to feed the Data model comes from various sources, internal and external. Internal sources are related to Company systems, while external sources are related to the Internet (web sites other than the company portal) or External Market Researches. Both internal and external raw data are converted according to predefined formats and templates, also known as "data interface agreements", in order to be mapped to the data model in a standard way.

Telecommunications data may include incoming and outgoing activates, including placed calls and texts. Without violating the customer's privacy, it is possible for the analytic record to indicate how much total time is associated with the customer's most-called numbers, how many different numbers the customer has called or texted, and how many total calls or texts the customer has received rather than how many calls or texts were received from the most connected number. These indicators are useful to measure the networking habits of the customer. Collectively with the customer's digital consumption data, this telecommunications data may provide the company with opportunities to further a positive business relationship with the customer by offering the customer opportunities that reflect the customer's usage. Other telecommunication may be related to pure network events like dropped calls and network data like the location of a SIM card of the company perceived by the cells of the wireless network, e.g., what cell phones the SIM card is used in.

The sentiment of the customer about the brand, the services and the products offered by the company can be identified by internal and external sources. The internal sources may include the call center agents notes about interactions with the customers, emails sent by the customers to the company, comments posted on a blog on the customer portal. The external sources may include the social networks. For example, the social networks may include posts and profile information provided by users in the social networks. The sentiment metrics at customer level, may be produced from the internal and external sources using text mining techniques, and then used to enrich the CAR.

Demographics data, including all of the demographics factors generally used when managing telecommunications data as well as those particularly relevant for digital consumption, may also be included in the data model.

Customer Analytic Record (CAR) and CAR Generating Procedure

Figure 2:
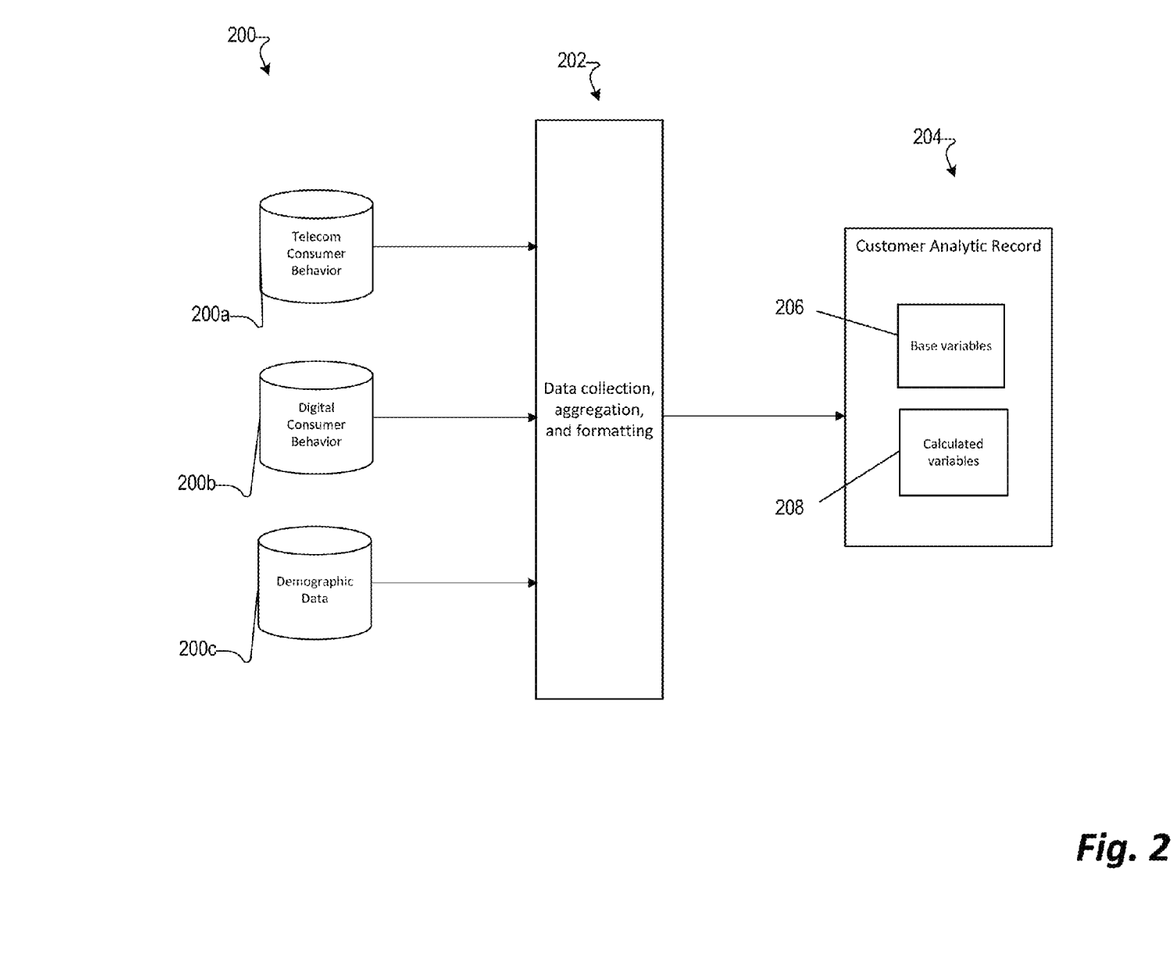
FIG. 2 is a diagram illustrating a customer analytic record generation process.

FIG. 2 illustrates an exemplary approach for generating a customer analytic record (CAR). Data stores 200 reflect customer data that may be stored in different locations using diverse systems and nonstandard formatting. Examples of data stores 200 include customer records associated with telecommunications accounts and purchases, represented by data store 200a, customer records associated with digital content downloads and purchases, represented by data store 200b, and demographic data for customers, represented by data store 200c. Other data from other sources may be included.

As shown at box 202, a procedure is designed on how to feed the CAR according to predefined and configurable analytical transformation functions. The data is previously aggregated in a customer-centered fashion; that is, data associated with a single customer across multiple data stores 200 or multiple periods of time (more granular than required data aggregation) or multiple events (transactions) is aggregated together. Since the stores 200 from which the data is retrieved may not all store the data in the same format, the procedure is designed to sanitize and standardize the data in order to fit the customer-centered data structures into which the data is aggregated.

Once the data is collected and aggregated by customer, the customer analytic records 208 (also known as CARs) are produced. The CAR 208 is a list of records where each record refers to a unique customer and each field is a variable related to the customer. Each customer analytic record represents all of the collected and aggregated data (base variables) as well as further analytical transformations to derive powerful indicators (calculated variables) associated with one customer.

The data structures representing each CAR 208 may involve many hundreds of variables representing customer data stored in a variety of ways. As shown, the CAR 208 may include both base variables 210 and calculated variables 212. The base variables 210 are those made available by the data stores 200 along with any other data acquired and aggregated in order to include in the CAR 208. If the CAR 208 is associated with a dedicated analytical data mart 204, as it often will be, the variables 210 are often metrics and dimensions associated with entities of a data model associated with the data mart 204.

In contrast to base variables 210, calculated variables 212 are calculated upon variables extracted from the data stores and historicized in the analytical data mart 204 according to predefined transformation rules. Calculated variables 212 may be stored in accordance with transformation functions 206 which are included as part of the CAR architecture. These operations may reorganize and tabulate existing data to produce values of interest for further analysis. Examples of functions and rules to determine additional variables may include:

SUM(X, n): Sum of the variable X in the last n months.
SLOPE(X): Trend of the X variable in the last n months.
DATA_REL(X): Number of the elapsed months between the day X and today.
CHART(X, n): Name of the most used Item (category or subcategory) in the last n months.
REL(X, n): Gap in percentage term between sum (calculated at customer level) of the variable X in last n months and average value (calculated on all customer base) of the sum of the variable X in last n months.
INC(X, n): Rate between Num (average of the X variable in last n months calculated at "dimension" level) and Den (average of the X variable in last n months).
AVG(X, n): Average of the X variable in last n months.
DROP(X): Rate between Num (value of the X variable in the last month) and Den (average of the X variable in the last n months).
LAG(X): Gap between the value of the X variable in the last month and the value of the X variable n months ago.

Some or all of these operations may be easily configured to be performed during the initial generation or later update of a customer analytic record. Alternatively, the operations may be performed on existing data (including any of the existing base and/or calculated variables) on the request of any analytic process or record system.

As mentioned also for the data model, the data may come from a variety of different sources. Third party data providers may tabulate consumer, competitor, and marketplace data. The CAR may include data from a variety of internal and external systems, as earlier explained. Further data can be related to external sources such as social network, internet, and geospatial data.

In order to standardize the CAR generation procedure, source data is provided by the company according to predefined formats or templates. If this analysis is conducted by an outside party, the data may be predefined according to an "interface agreement" or other explicitly defined arrangement.

Figure 3:
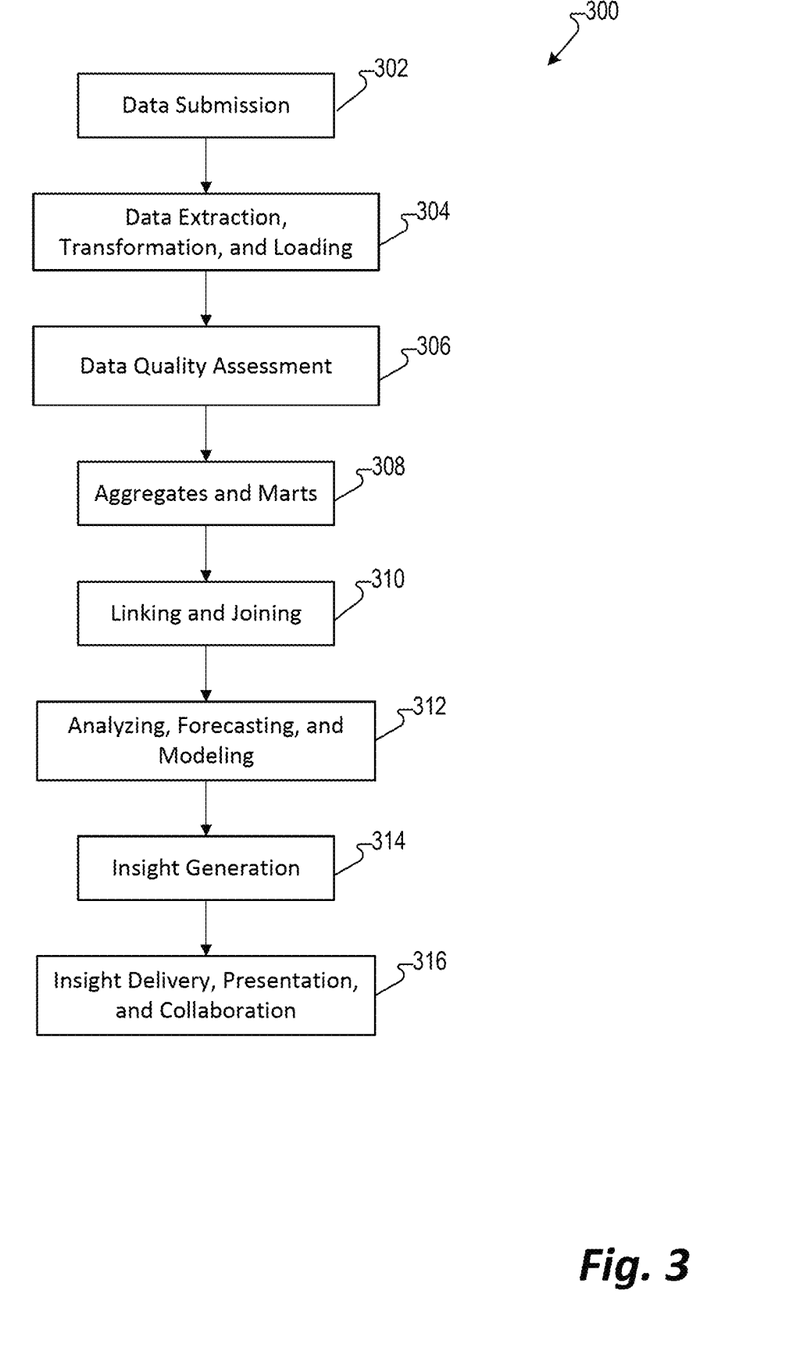
FIG. 3 is a flowchart of an example process for generating and using a customer analytic record.

FIG. 3 is a flowchart illustrating a process 300 by which a customer analytic record may be created and used according to some implementations.

Data is submitted or generated for use in the source system (302). The data may come from a variety of different sources. Third party data providers may tabulate consumer, competitor, and marketplace data. The system may include or may extract data from a variety of internal and external systems, as earlier explained; this data may include past and current information about customers, suppliers, products, and the company's business situation (revenue, profits, etc). Further data can be scraped from external sources such as social network, internet, and geospatial data.

This raw data may then be extracted, transformed, and loaded into more usable forms (304). This process may be dictated by the method of acquiring the data and the nature of the data itself; for example, unstructured data scraped from the web may need to be filtered, parsed, and crawled by keyword or other metric, while internal data may just need to be reformatted and sanitized for use in analytical data structures.

Part of managing the acquired data may involve data quality assessment (306), which may include checking the data for quality and completeness. Incomplete or irrelevant data may be re-categorized or discarded. This may also include error-checking capabilities, exception handling, and recovery. A determination as to the value of the acquired data, and what further analysis is merited, may be performed at the data quality assessment stage.

Once the data is processed and approved, it may be aggregated and placed into marts for use (308). The aggregation process will generally involve sorting and combining data according to customer identity. A wide variety of marts may be used, including business partner marts, customer marts, and unstructured marts, to reflect different methods by which data is generated.

Further analytical transformations (310) can be performed on aggregated and historicized data within the customer mart in order to deeply characterize each customer and maximize performances of data mining applications such as predictive modeling and clustering.

Once the system has processed the data and made it available for use, a variety of analyzing, forecasting, and modeling processes may be performed (312). Customer segmentation, statistical analysis, forecasting and extrapolation, predictive modeling, optimization, and data mining may be used to generate a variety of useful results from the data.

The data analysis may result in further insights (314). Insights may include the clear delineation of customer segments, root cause analysis, an identification of important trends, threats and opportunity detection, resources and intervention optimization, and context for unstructured data.

This data can be presented to and used by the company in a number of ways (316), including alerts, structure queries, feeds for ad hoc reporting, dashboards for static reporting, and insight case management. Any of these can be formatted and digested to be presented to marketing and business managers within the company in any appropriate format.

Figure 4:
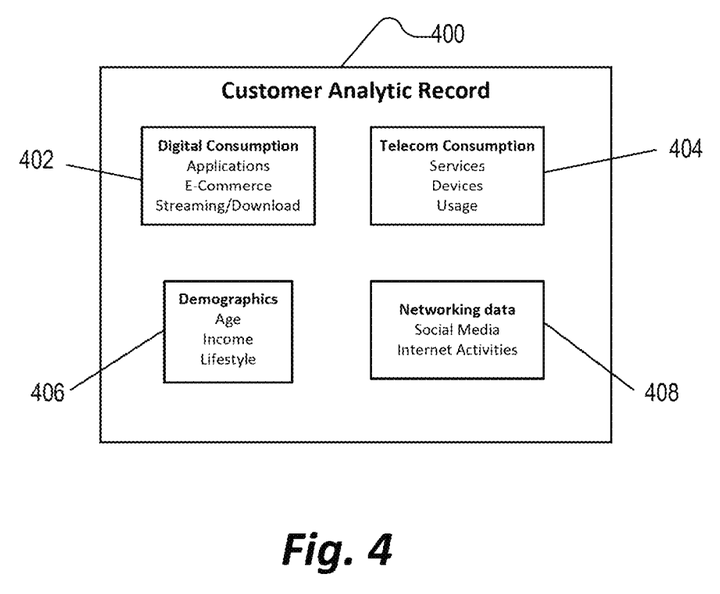
FIG. 4 shows a block diagram of an exemplary customer analytic record.

FIG. 4 shows an example of a customer analytic record 400, which may include a variety of data. All of the data associated with one specific customer is included in the record 400, including digital consumption data 402, telecommunications data 404, demographic data 406, and networking data 408. Customer data associated with other products and services provided by the company or other companies may be included, along with any other data acquired internally or from third party sources.

Examples of each of the data categories 402, 404, 406, and 408 has previously been described with respect to the data model above. However, the metrics and dimensions discussed above with respect to each of these data categories represents base variables. In addition to the base variables, the CAR 400 may include calculated variables in one or more of these categories, using the example operations listed above or further calculations as appropriate. For example, calculated variables in the category of digital consumption data 402 may include:

The number of applications downloaded in one month belonging to the category of Educational Tools.

The volume (measured in MB) of streaming downloaded in a specific day of the week.

The number of products purchased on-line in one month (e.g. from self-service portal) belonging to the high price class (e.g. greater or equal to $50).

The volume (in MB) of applications downloaded in one week for a Tablet type of target device.

The number of streaming products purchased in one week whose content is rated for 17+ aged consumers.

The CAR variables can be used as an input for predictive analysis and statistical modeling according to business objectives like the segmentation of the customer base or definition of churn propensity of the customers. Once the CAR has been generated, it can be available for use, a variety of analyzing, forecasting, and modeling processes. Customer segmentation, statistical analysis, forecasting and extrapolation, predictive modeling, optimization, and data mining may be used to generate a variety of useful results from the data.

The foregoing includes a significant number of lists representing various options, features, metrics, dimensions, and products. These lists are merely examples of the options available in some implementations and should not be understood to be exhaustive nor to limit the scope of this disclosure; other implementations may include further options not listed and may fail to exclude listed options.

Computing Device

Figure 5:
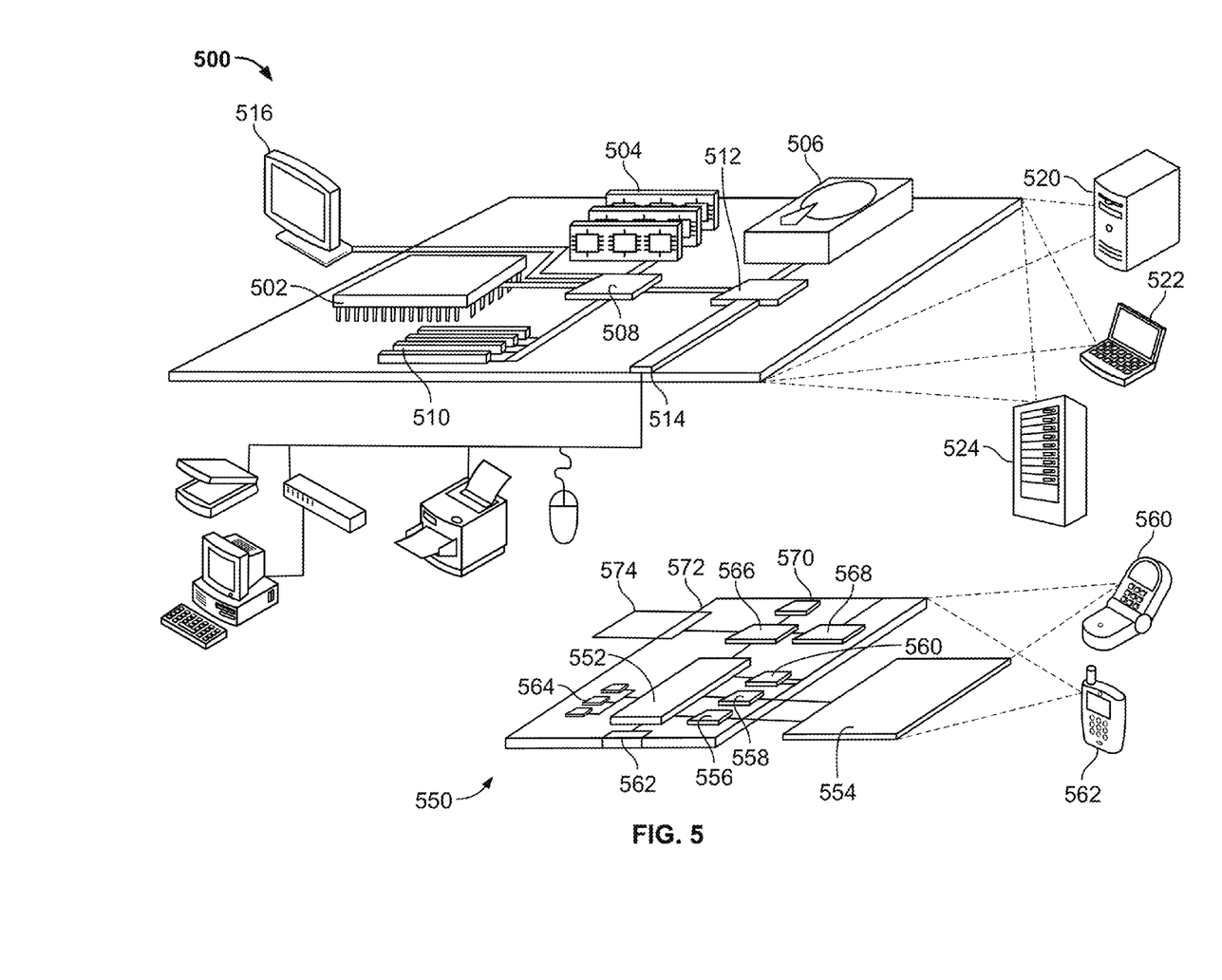
FIG. 5 shows an example of a generic computer device and a generic mobile computer device, which may be used with the techniques described here.

FIG. 5 shows an example of a generic computer device 500 and a generic mobile computer device 550, which may be used with the techniques described here.

Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, tablet computers and other similar computing devices. The components shown here, their connections and relationships, and their functions, are meant to be exemplary only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method for generating and implementing a data model, comprising:
    identifying a plurality of entities, each entity having one or more metrics defining data related to a customer, the plurality of entities including at least
        a customer entity, and
        a digital consumption entity;
    defining relationships between entities among the plurality of entities;
    for each entity, selecting an electronic data source storing data compatible with the one or more metrics of that entity;
    implementing data flow and control processes on the selected electronic data sources consistent with the relationships identified between the entities;
    extracting data, related to a customer entity's digital consumption, from each of the selected electronic data sources by an analytical transformation engine in accordance with the implemented data flow and control processes, the extracting data including:
        determining, by the analytical transformation engine, a first portion of the data from crawling unstructured data obtained by a web crawler engine from web resources for keywords;
        converting, by the analytical transformation engine, a second portion of the data according to a mapping defined by a template; and
        discarding, by the analytical transformation engine, by portions of the first portion of data and the second portion of data that are determined to be of insufficient data quality; and
    for each of the customer entities:
        identifying, by the analytical transformation engine, the extracted data related to the customer entity;
        aggregating, by the analytical transformation engine, the identified extracted data into a customer-centric data structure for the customer entity, wherein the customer-centric data structure for the customer entity includes at least a digital consumption field, a customer demographic field, and a telecommunications field; and
        storing, by the analytical transformation engine, the customer-centric data structure in the electronic data source selected for the customer entity; and
    presenting, by the analytical transformation engine, a report based on the stored customer-centric data structures for the customer entities.

2. The method of claim 1, wherein the plurality of entities further includes a telecommunications consumption entity.

3. The method of claim 1,
    wherein defining relationships between entities comprises defining a relationship between the customer entity and the digital consumption entity; and
    wherein implementing data flow and control processes comprises transferring data including the digital consumption behavior of a customer to an electronic data source that stores data about the customer aggregated from a plurality of electronic data sources.

4. The method of claim 3, wherein the electronic data source to which the digital consumption behavior of the customer is transferred, is selected for the customer entity.

5. A system comprising:
one or more computers and one or more storage devices storing instructions that are operable, when executed by the one or more computers, to cause the one or more computers to perform operations comprising:
identifying a plurality of entities, each entity having one or more metrics defining data related to a customer, the plurality of entities including at least
a customer entity, and
a digital consumption entity;
defining relationships between entities among the plurality of entities;
for each entity, selecting an electronic data source storing data compatible with the one or more metrics of that entity;
implementing data flow and control processes on the selected electronic data sources consistent with the relationships identified between the entities;
extracting data, related to a customer entity's digital consumption, from each of the selected electronic data sources by an analytical transformation engine in accordance with the implemented data flow and control processes, the extracting data including:
determining, by the analytical transformation engine, a first portion of the data from crawling unstructured data obtained by a web crawler engine from web resources for keywords;
converting, by the analytical transformation engine, a second portion of the data according to a mapping defined by a template; and
discarding, by the analytical transformation engine, portions of the first portion of data and the second portion of data that are determined to be of insufficient data quality; and
for each of the customer entities:
identifying, by the analytical transformation engine, the extracted data related to the customer entity;
aggregating, by the analytical transformation engine, the identified extracted data into a customer-centric data structure for the customer entity, wherein the customer-centric data structure for the customer entity includes at leas a digital consumption field, a customer demographic field, and a telecommunications field; and
storing, by the analytical transformation engine, the customer-centric data structure in the electronic data source selected for the customer entity; and
presenting, by the analytical transformation engine, a report based on the stored customer-centric data structures for the customer entities.

6. The system of claim 5, wherein the plurality of entities further includes a telecommunications consumption entity.

7. The system of claim 5,
wherein defining relationships between entities comprises defining a relationship between the customer entity and the digital consumption entity; and
wherein implementing data flow and control processes comprises transferring data including the digital consumption behavior of a customer to an electronic data source that stores data about the customer aggregated from a plurality of electronic data sources.

8. The system of claim 7, wherein the electronic data source to which the digital consumption behavior of the customer is transferred, is selected for the customer entity.

9. A non-transitory computer-readable medium storing software comprising instructions executable by one or more computers which, upon such execution, cause the one or more computers to perform operations comprising:
identifying a plurality of entities, each entity having one or more metrics defining data related to a customer, the plurality of entities including at least
a customer entity, and
a digital consumption entity;
defining relationships between entities among the plurality of entities;
for each entity, selecting an electronic data source storing data compatible with the one or more metrics of that entity;
implementing data flow and control processes on the selected electronic data sources consistent with the relationships identified between the entities;
extracting data, related to a customer entity's digital consumption, from each of the selected electronic data sources by an analytical transformation engine in accordance with the implemented data flow and control processes, the extracting data including:
determining, by the analytical transformation engine, a first portion of the data from crawling unstructured data obtained by a web crawler engine from web resources for keywords;
converting, by the analytical transformation engine, a second portion of the data according to a mapping defined by a template; and
discarding, by the analytical transformation engine, portions of the first portion of data and the second portion of data that are determined to be of insufficient data quality; and
for each of the customer entities:
identifying, by the analytical transformation engine, extracted data related to the customer entity;
aggregating, by the analytical transformation engine, the identified extracted data into a customer-centric data structure for the customer entity, wherein the customer-centric data structure for the customer entity includes at least a digital consumption field, a customer demographic field, and a telecommunications field; and
storing, by the analytical transformation engine, the customer-centric data structure in the electronic data source selected for the customer entity; and
presenting, by the analytical transformation engine, a report based on the stored customer-centric data structures for the customer entities.

10. The medium of claim 9, wherein the plurality of entities further includes a telecommunications consumption entity.

11. The medium of claim 9,
wherein defining relationships between entities comprises defining a relationship between the customer entity and the digital consumption entity; and
wherein implementing data flow and control processes comprises transferring data including the digital consumption behavior of a customer to an electronic data source that stores data about the customer aggregated from a plurality of electronic data sources.

12. The medium of claim 11, wherein the electronic data source to which the digital consumption behavior of the customer is transferred, is selected for the customer entity.

* * * * *

UNITED STATES PATENT AND TRADEMARK OFFICE
CERTIFICATE OF CORRECTION

PATENT NO. : 9,536,002 B2
APPLICATION NO. : 13/779115
DATED : January 3, 2017
INVENTOR(S) : Astrid Bohe et al.

Page 1 of 1

It is certified that error appears in the above-identified patent and that said Letters Patent is hereby corrected as shown below:

In the Claims

In Claim 1, Column 14, Line 34 after "engine," delete "by".

In Claim 5, Column 15, Line 43 (approx.) delete "leas" and insert -- least --, therefor.

In Claim 9, Column 15, Line 35 (approx.) before "extracted" insert -- the --.

Signed and Sealed this
Sixteenth Day of May, 2017

Michelle K. Lee
*Director of the United States Patent and Trademark Office*